J. L. LITTLE.
FEATHER-DUSTER.
No. 7,171. Reissued June 13, 1876.
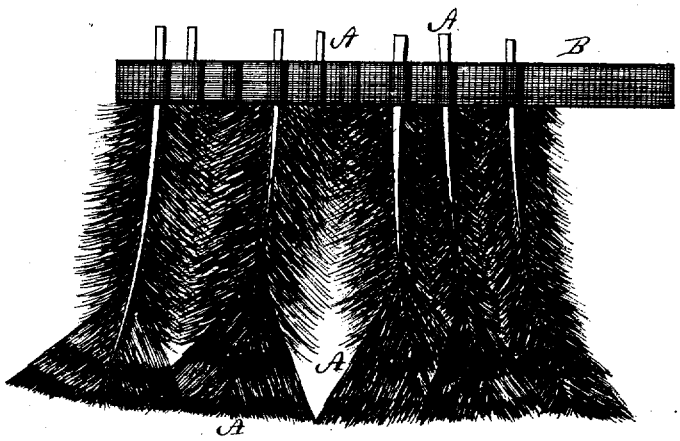
WITNESSES
Franck L. Durand
C. L. Emil.
By
INVENTOR
John L. Little
T. H. Allander
Attorney.
N. PETERS, PHOTO-LITHOGRAPHER, WASHINGTON, D. C.

UNITED STATES PATENT OFFICE.

JOHN L. LITTLE, OF MUNCIE, INDIANA.

IMPROVEMENT IN FEATHER DUSTERS.

Specification forming part of Letters Patent No. 147,146, dated February 3, 1874; reissue No. 7,171, dated June 13, 1876; application filed February 25, 1876.

*To all whom it may concern:*

Be it known that I, JOHN L. LITTLE, of Muncie, in the county of Delaware and State of Indiana, have invented certain new and useful Improvements in Dusters; and I do hereby declare that the following is a full, clear, and exact description thereof, reference being had to the accompanying drawings, and to the letters of reference marked thereon, which form a part of this specification.

The nature of my invention consists in a brush or duster having the dusting material secured upon one or more pieces of cloth, or other suitable material, and attached to a handle, substantially in the manner hereinafter described.

In order to enable others skilled in the art to which my invention appertains to make and use the same, I will now proceed to describe its construction and operation, referring to the annexed drawing.

A A represent the material of which the dusting part of the brush or duster is composed. This material is arranged in any desired manner upon one or more pieces, B, of cloth, or other suitable material, and sewed to the same. The cloth B, with the material A secured thereto, is then wound around the handle and fastened to the same by glue, cement, or other suitable means, after which the brush is finished off in any desired manner.

The advantages in this method of making brushes or dusters are, the facility with which the dusting material is arranged in any desired position with reference to size, color, and shape, the firm and substantial manner of the fastening, and the small amount of labor required in the operation, producing a brush both beautiful and light.

Having thus fully described my invention, what I claim as new, and desire to secure by Letters Patent, is—

A duster or brush constructed by securing the dusting material to a flexible material, and fastening the same to the handle, substantially as and for the purposes herein set forth.

In testimony that I claim the foregoing as my own I affix my signature in presence of two witnesses.

JOHN L. LITTLE.

Witnesses:
WILLIAM L. LITTLE,
SAMUEL GAYMAN.